3,179,613
METAL SALTS OF OLIGOMERIC STYRENE POLYMER IN OLEFINIC EMULSION POLYMERIZATION PROCESS
Wolfgang Guenther and Helmut Ohlinger, Ludwigshafen (Rhine), Germany, assignors to Badische Anilin- & Soda-Fabrik Aktiengesellschaft, Ludwigshafen (Rhine), Rheinland-Pfalz, Germany
No Drawing. Filed Sept. 13, 1962, Ser. No. 223,550
Claims priority, application Germany, Sept. 20, 1961, B 64,065
2 Claims. (Cl. 260—29.6)

This invention relates to a process for the production of emulsion polymers by polymerization of ethylenically unsaturated polymerizable compounds.

Polymerization of ethylenically unsaturated polymerizable compounds in emulsion has been known for a long time. It is carried out in aqueous phase in the presence of suitable emulsifiers and of water-soluble polymerization catalysts. The emulsifiers conventionally used in emulsion polymerization are soluble in water. In the case of direct drying of the emulsion they remain completely in the polymer and can only be removed partially by precipitation of the emulsion and washing and drying the polymer. Emulsifiers remaining in the polymers often affect the properties of the finished polymers and of shaped articles prepared therefrom in an undesirable way. Because of the water-solubility of the emulsifiers, emulsion polymers have a more or less high water absorptivity depending on the type and amount of emulsifier. Moreover the clarity of the polymers is decreased by the emulsifiers.

The addition of emulsifiers can be completely or at least substantially avoided by carrying out the polymerization of the monomeric compounds in aqueous suspension. Polymers obtained in this way contain practically no emulsifier but are often considerably more difficult to process than the equivalent emulsion polymers. In some cases it is not possible to polymerize in aqueous suspension at all, because of the consistency of the polymer obtained.

The present invention relates to a process in which ethylenically unsaturated polymerizable compounds are polymerized in aqueous emulsion in conventional manner. The invention relates particularly to compounds having emulsifying action which, although they remain in the polymer, do not unfavorably affect the properties of the polymer.

We have found that ethylenically unsaturated polymerizable compounds can be polymerized advantageously in aqueous emulsion and in the presence of polymerization catalysts by using as emulsifier a sulfinic acid, sulfonic acid or carboxylic acid salt of an oligomeric styrene of the general formula:

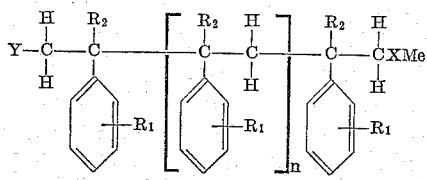

in which $R_1$ denotes a hydrogen atom or an alkyl group having one to eight carbon atoms, $R_2$ denotes a hydrogen atom or an alkyl group having from one to eight carbon atoms, X denotes $—CO_2^-$, $—SO_2^-$ or $—SO_3^-$, Y denotes MeX, H, $MeSO_3$, $MeSO_2$ or $MeCO_2$, Me denotes a metal radical or ammonium and $n$ is one of the whole numbers from 1 to 18.

The emulsifiers to be used according to this invention may be prepared in a simple way by preparing the corresponding metal compounds from styrene or an alkyl styrene in tetrahydrofuran, and then reacting the metal compounds with carbon dioxide. The emulsifier remains behind when the tetrahydrofuran has been evaporated off. The metal compound may be converted with sulfur dioxide into the corresponding sulfinic acid salts and these may readily be converted into sulfonic acid salts with oxidizing agents, such as hydrogen peroxide. By reacting the dimetal compounds with a mixture of sulfur dioxide and carbon dioxide, monosulfinic acid monocarboxylic acids are obtained from which the monosulfonic acid monocarboxylic acids may be obtained by oxidation. After the tetrahydrofuran has been evaporated off, the emulsifier remains behind.

By oligomers we mean lower polymers containing about two to twenty, preferably four to fifteen, styrene units per molecule.

The actual preparation of the emulsifiers is not the subject of the present invention.

In addition to oligomers of styrene itself, there may also be used oligomers of styrenes which are substituted in the chain or in the nucleus by alkyl groups containing one to eight carbon atoms, for example the monosulfinic, disulfinic or sulfonic acid salts or monocarboxylic or dicarboxylic acid salts of the oligomers of α-methylstyrene or of vinyltoluene.

The alkali metal salts, i.e., sodium, potassium, rubidium, salts and also the ammonium salts of the oligomeric acids are especially suitable. Other metals suitable for forming the salts are magnesium, calcium, strontium, barium, tin or zinc. In special cases it is also possible to use salts of other metals.

These emulsifiers are more or less readily soluble in water depending on the number of combined styrene molecules, and the type of metal. They are also wholly or partially soluble in a number of organic solvents, as for example tetrahydrofuran, benzene, ethylbenzene, dioxane, chloroform and acetophenone. They are used in amounts between about 0.1 and 4% by weight, preferably between about 1 and 2% by weight, with reference to the amount of compounds to be polymerized. They may be present at the commencement of the polymerization but may also be added gradually to the polymerization batch. Similarly, the monomers to be polymerized and the catalysts may also be wholly present at the beginning of the polymerization or may be added individually or jointly to the polymerization batch during the polymerization.

Especially suitable examples of ethylenically unsaturated polymerizable compounds for homopolymerization or copolymerization with the said emulsifiers in aqueous emulsion are vinyl or vinylidene compounds, such as styrene, α-methylstyrene, vinyltoluene, chlorostyrenes, vinylcarbazole, vinylpyrrolidone, acrylic acid, esters of acrylic acid with alcohols containing about one to eighteen carbon atoms in the chain, acrylonitrile, vinyl fluoride, vinyl chloride, vinylidene chloride and vinyl esters, such as vinyl acetate, vinyl propionate or vinyl stearate, or vinyl ethers. Derivatives of methacrylic acid, for example esters, the nitrile, and also maleic acid and fumaric acid and their esters and half esters and polyunsaturated compounds, such as butadiene isoprene, chloroprene, and also dichlorobutadiene and divinylbenzene, are also suitable as monomeric compounds, either as homomonomers or especially as comonomers.

The initiators conventionally used in emulsion polymerizations are used as polymerization catalysts. Examples of these are organic or inorganic radical-forming compounds, such as peracetic acid, azodiisobutyramide, hydrogen peroxide or persulfates. Mixtures of different catalysts, for example of organic and inorganic peroxides, or redox catalyst systems, such as hydrogen peroxides with formaldehyde sulfoxylate, may also be used. Although the polymerization is preferably carried out in pure aqueous emulsion, it may also be carried out in aqueous systems which also contain organic solvents.

The polymerization temperature is about 30° to 120° C. depending on the type of monomers and catalysts used. In special cases the polymerization may be carried out at much lower temperatures or if desired at higher temperatures. Polymerization is in general carried out at normal pressure but reduced pressure or increased pressure may be used.

The polymerization may be carried out batchwise in single charges; it may also be carried out continuously, an amount of finished emulsion being removed per unit of time which is equivalent to the amount of initial products added.

The emulsion polymers obtained may be worked up in the conventional ways. The emulsions may be coagulated by freezing, boiling or by adding precipitants. The finished products may also be obtained by spray drying or by drying on rollers.

The anhydrous polymers isolated from the emulsions are clear and characterized by especially good resistance to water. The emulsions of these polymers are stable to mechanical stress and froth only very slightly.

The invention is illustrated by, but not limited to, the following examples in which the parts are by weight.

EXAMPLE 1

Emulsifier A 2 moles of sodium is stirred with 8 moles of α-methylstyrene in three times the amount of tetrahydrofuran at 45° to 55° C. until all the sodium has dissolved. The dark red solution obtained is cooled to —50° C. for a short time. Then dry carbon dioxide is passed in until the solution has become colorless. The tetrahydrofuran is evaporated off and the emulsifier remains behind ready for use.

800 parts of water, 400 parts of styrene, 1.2 parts of potassium persulfate and 4 parts of emulsifier A are stirred under nitrogen in an agitated vessel. The batch is heated to about 70° C. Polymerization begins at this temperature and by the polymerization heat set free the polymerization mixture heats up to about 100° C. and boils under reflux. The mixture is kept at this temperature for four hours and then cooled. The polymer is recovered from the emulsion by drying in vacuo at 80° C.

The polystyrene thus obtained gives completely clear and colorless pressed sheets. A sheet 1 mm. in thickness undergoes an increase in weight of 0.015% after lying in water at 20° C. for seven days and is still clear after this period. Polystyrene prepared under otherwise the same conditions but with the use of a commercial emulsifier, for example a sodium alkylsulfonate, instead of emulsifier A, gives cloudy pressed sheets which exhibit an increase in weight of 0.45% after lying for seven days in water at 20° C.

EXAMPLE 2

800 parts of water, 400 parts of ethyl acrylate, 0.8 part of potassium persulfate and 8 parts of emulsifier A (as described in Example 1) are stirred under nitrogen in an agitated vessel and heated to 75° C. Polymerization begins after a short time at this temperature and the contents of the vessel heat up to boiling temperature. After the first vigorous reaction has subsided, the batch is kept at 95° C. for another two hours. After this period, the polymerization is completed.

The emulsion of ethyl acrylate polymer thus prepared is characterized by particularly low frothing. The emulsion dries in thin layers to clear waterproof films.

EXAMPLE 3

800 parts of water, 150 parts of styrene, 50 parts of acrylonitrile, 1.2 parts of potassium persulfate and 6 parts of emulsifier A are stirred under nitrogen in an agitated vessel and heated up to 70° C. When polymerization begins, the contents of the vessel heat up to about 90° C. A mixture of 150 parts of styrene and 50 parts of acrylonitrile is dripped into the batch at such a rate that the contents of the vessel are kept at a temperature of 90° C. When all has been dripped in, the vessel is kept at 90° C. for another ninety minutes.

After the emulsion has been dried, a copolymer of styrene and acrylonitrile is obtained which gives completely clear pressed sheets.

EXAMPLE 4

Emulsifier B 1 mole of sodium is stirred with 1 mole of naphthalene at 50° C. in tetrahydrofuran until all the sodium has dissolved. The dark green solution obtained is cooled to —60° C. and 6 moles of styrene is added slowly. Carbon dioxide is led into the solution until it is colorless. Tetrahydrofuran and naphthalene are evaporated off. Emulsifier B remains behind.

1,600 parts of water, 800 parts of styrene, 2.4 parts of potassium persulfate and 16 parts of emulsifier B are stirred in a agitated vessel while being rinsed with nitrogen and heated to 85° C. After six hours, another 1.2 parts of potassium persulfate is added to the batch and polymerization continued for another three hours at 90° C. After this period, the polymerization has ended and the emulsion is dried on hot rollers.

The polystyrene thus obtained gives clear colorless pressed sheets having very low water absorptivity.

EXAMPLE 5

Emulsifier C

The emulsifier is prepared in the same way as emulsifier B (Example 4) but using vinyltoluene instead of styrene.

1,600 parts of water, 800 parts of styrene, 2.4 parts of potassium persulfate and 16 parts of emulsifier C are polymerized and worked up as described in Example 4. The polystyrene obtained is similar in its properties to the polystyrene of Example 4.

EXAMPLE 6

800 parts of water, 200 parts of styrene, 1.2 parts of potassium persulfate and 8 parts of emulsifier A (as described in Example 1) are charged to a pressure vessel. The vessel is first rinsed well with nitrogen and then evacuated. 200 parts of butadiene is forced into the evacuated vessel. The mixture is heated at 60° C. for twelve hours while stirring. After this period, the pressure has fallen to about 1.5 atmospheres gauge.

The dry product can be obtained from the resultant emulsion of a styrene-butadiene copolymer in the conventional ways. It has a very low water absorptivity.

EXAMPLE 7

800 parts of water, 1.2 parts of potassium persulfate and 12 parts of emulsifier A (as described in Example 1) are charged into an agitated pressure vessel which has first been rinsed with nitrogen and then evacuated. 400 parts of vinyl chloride is forced into the evacuated vessel. The vessel is heated to 50° C. while stirring until the initial pressure of 8 atmospheres gauge has fallen back to 3 atmospheres gauge. At this pressure, which is reached after about eighteen hours, the vessel is cooled and the pressure released.

The polyvinyl chloride emulsion obtained is dried in a spray dryer. The solid product thus obtained may be stirred with dioctyl phthalate to form plastisols which have a good shelf life.

EXAMPLE 8

400 parts of water, 0.6 part of potassium persulfate, 4 parts of emulsifier A (as described in Example 1), 100 parts of styrene, 50 parts of acrylonitrile and 50 parts of vinylcarbazole are stirred under nitrogen in an agitated vessel and heated until reflux begins. The vessel is then heated for six hours so that the contents boil gently under reflux. The polymerization is practically ended after this period and the hot emulsion is freed from the last traces of monomers by leading nitrogen thereover.

The emulsion obtained can be worked up by the conventional methods to a solid copolymer of styrene, butadiene and vinylcarbazole which is characterized by special resistance to water.

EXAMPLE 9

Emulsifier D 2 moles of sodium is stirred with 8 moles of α-methylstyrene in five times the amount of tetrahydrofuran at 45° to 55° C. until all the sodium has dissolved. The dark red solution obtained is cooled for a short time to —50° C. Then dry sulfur dioxide is led in until the solution has lost its color. The emulsifier remains behind after the tetrahydrofuran has been evaporated off.

800 parts of water, 400 parts of styrene and 4 parts of emulsifier D are stirred under nitrogen in an agitated vessel and the mixture is heated to 70° C. 1.2 parts of potassium persulfate in 10 parts of water is added uniformly during the course of three hours at this temperature. As soon as polymerization begins, the polymerization mixture heats up to about 100° C. and boils under reflux. The mixture is kept at this temperature for about three hours and is then cooled. The polymer is recovered from the emulsion by drying at 80° C.

The polystyrene obtained gives clear and colorless pressed sheets. A sheet 1 mm. in thickness undergoes an increase in weight of 0.065% after laying for seven days in water at 20° C., and after this period is still clear. A polystyrene prepared under the same conditions but using a commercial emulsifier, for example a sodium alkylsulfonate instead of emulsifier A, gives cloudy pressed sheets which exhibit an increase in weight of 0.45% after lying for seven days in water at 20° C.

EXAMPLE 10

Emulsifier E 2 moles of sodium is stirred with 6 moles of α-methylstyrene in five times the amount of tetrahydrofuran at 45° to 55° C. until all the sodium has dissolved. The dark red solution obtained is cooled to —50° C. Sulfur dioxide is led in at this temperature until the solution is colorless. Then the sulfinic acid formed is oxidized to the sulfonic acid with hydrogen peroxide. After evaporating off the tetrahydrofuran, the emulsifier ready for use remains behind.

1,600 parts of water, 800 parts of styrene, 16 parts of emulsifier E and 2.4 parts of potassium persulfate are stirred under nitrogen in an agitated vessel. The mixture is preheated to about 70° C. Polymerization begins at this temperature and the polymerization heat thereby set free heats up the mixture to about 100° C. and the emulsion boils under reflux. The mixture is kept at this temperature for four hours and then cooled. The polymer is recovered from the emulsion by drying at 80° C. in vacuo.

The polystyrene thus obtained gives clear and colorless pressed sheets. A pressed sheet 1 mm. in thickness shows an increase in weight of 0.08% after lying for seven days in water at 20° C. and is still completely clear after this period.

EXAMPLE 11

800 parts of water, 400 parts of ethyl acrylate, 4 parts of acrylic acid, 0.8 part of potassium persulfate and 8 parts of emulsifier E (as described in Example 10) are stirred under nitrogen in an agitated vessel and heated to 75° C. Polymerization begins after a short time at this temperature and the contents of the vessel heat up to 100° C. After the initial violent reaction has subsided, the batch is kept at 95° C. for another two hours. After this period, the polymerization is ended.

The emulsion of the ethyl acrylate polymer thus prepared is characterized by particularly low frothing. The emulsion dries in thin layers to clear waterproof films.

EXAMPLE 12

1,600 parts of water, 16 parts of emulsifier E and 2 parts of potassium persulfate are charged to an agitated pressure vessel. The vessel is closed pressure-tight and rinsed with nitrogen until all the oxygen has been removed. Then 800 parts of vinyl chloride is forced in. The vessel is heated to 50° C. with stirring and kept at this temperature until the initial pressure of 8 atmospheres gauge has fallen after about twelve hours to 3.5 atmospheres gauge. The vessel is then cooled and the pressure carefully released. The polyvinyl chloride emulsion obtained is worked up in a spray dryer. The polymer powder obtained may be mixed with dioctyl phthalate to form pastes having a good shelf life.

EXAMPLE 13

Emulsifier F 2 moles of sodium is stirred with 7 moles of α-methylstyrene in four times the amount of tetrahydrofuran at 45° to 50° C. until all the sodium has dissolved. The dark red solution thus obtained is cooled to —50° C. At this temperature sulfur dioxide and carbon dioxide are passed in at the same time and in equimolar amounts until the solution has lost its color. Emulsifier F remains behind when the tetrahydrofuran has been evaporated off.

1,600 parts of water, 400 parts of styrene and 20 parts of emulsifier F are charged into an agitated pressure vessel. After the vessel has been flushed out well with nitrogen, 400 parts of butadiene is forced in. The vessel is heated to 45° C. with stirring. After the said temperature has been reached, 3 parts of potassium persulfate in 30 parts of water is metered into the vessel during the course of about ten hours. After a further two hours, the vessel is cooled and the pressure released. The emulsion obtained is dried on hot rollers. The styrene-butadiene copolymer thus prepared is characterized by good resistance to water.

EXAMPLE 14

Emulsifier G 1 mole of sodium is stirred with 1 mole of naphthalene at 50° C. in tetrahydrofuran until all the sodium has dissolved. The dark green solution obtained is cooled to —60° C. and then 6 moles of styrene is slowly added. Sulfur dioxide is passed into the solution until it loses its color. Tetrahydrofuran and naphthalene are then evaporated off. Emulsifier G remains behind.

1,600 parts of water, 800 parts of styrene and 16 parts of emulsifier G are stirred in an agitated vessel while flushing with nitrogen and heated to 85° C. 2.4 parts of potassium persulfate dissolved in 15 parts of water is dripped into the batch within three hours. The polymerization mixture is then kept at 90° C. for another two hours. After this period, the polymerization is ended and the emulsion is dried on hot rollers. Clear colorless pressed sheets can be prepared from the resultant polystyrene. They have low water absorptivity.

EXAMPLE 15

Emulsifier H 2 moles of sodium and 4 moles of α-methylstyrene are stirred in four times the amount of tetrahydrofuran at 40° C. until all the sodium has dissolved. The dark red solution is cooled to —50° C. At this temperature, first 3 moles of vinyltoluene is slowly dripped into the solution and then sulfur dioxide is passed in until the solution is colorless. The sulfinic acid formed is oxidized to sulfonic acid in the colorless solution with hydrogen peroxide.

After evaporating off the tetrahydrofuran, emulsifier H remains behind.

1,600 parts of water, 800 parts of styrene, 2.4 parts of potassium persulfate and 16 parts of emulsifier H are polymerized in the way described in Example 10 and the dispersion obtained is worked up according to Example 10. The polystyrene obtained has similar properties to the polystyrene of Example 10.

What we claim is:

1. In a process for the production of polymers by polymerization of ethylenically unsaturated polymerizable compounds in aqueous dispersions in the presence of radical forming initiators and emulsifiers, the improvement which comprises using as emulsifier 0.1 to 4% by weight, with reference to the compounds to be polymerized, of a compound of the formula:

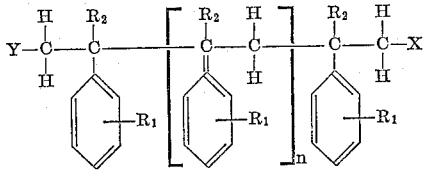

in which $R_1$ and $R_2$ denote hydrogen and alkyl containing 1 to 8 carbon atoms, X denotes a member selected from the group consisting of $MeCO_2-$, $MeSO_2-$, and $MeSO_3-$, and Y denotes a member selected from the group consisting of $H-$, $MeSO_2-$, $MeSO_3-$ and $MeCO_2-$, wherein Me is a radical selected from the group consisting of an alkali metal having an atomic weight in the range of 23 to 85.5, an alkaline earth metal having an atomic weight in the range of 24.3 to 137.4, zinc, tin and ammonium, and $n$ is an integer of 1–18.

2. A process as claimed in claim 1 wherein Me is an alkali metal having an atomic weight in the range of 23–85.5.

References Cited by the Examiner
UNITED STATES PATENTS

| | | | |
|---|---|---|---|
| 2,171,867 | 9/39 | Scott et al. | 260—515 |
| 2,283,236 | 5/42 | Soday | 260—505 |
| 2,985,594 | 5/61 | Zimmermann | 260—618 |

OTHER REFERENCES

Sutheim: Introduction to Emulsions, Chem. Publishing Co., Brooklyn, N.Y., 1946.

LEON J. BERCOVITZ, *Primary Examiner.*

WILLIAM H. SHORT, *Examiner.*